(12) United States Patent
Ohata et al.

(10) Patent No.: US 8,163,425 B2
(45) Date of Patent: Apr. 24, 2012

(54) SECONDARY BATTERY (75) Inventors: Tsumoru Ohata, Kyoto (JP); Junji Nakajima, Osaka (JP); Tetsuya Hayashi, Kadoma (JP); Shigeo Ikuta, Kawanabe-gun (JP); Yusuke Fukumoto, Moriguchi (JP)

(73) Assignee: Panasonic Corporation, Osaka (JP)

( * ) Notice: Subject to any disclaimer, the term of this patent is extended or adjusted under 35 U.S.C. 154(b) by 766 days.

(21) Appl. No.: 12/213,504

(22) Filed: Jun. 20, 2008

(65) Prior Publication Data

US 2008/0274399 A1 Nov. 6, 2008

Related U.S. Application Data (62) Division of application No. 10/555,657, filed as application No. PCT/JP2005/001762 on Feb. 7, 2005.

(30) Foreign Application Priority Data

Feb. 18, 2004 (JP) ................................. 2004-041106

(51) Int. Cl.
*H01M 6/04* (2006.01)
(52) U.S. Cl. .......................... 429/251; 429/247; 429/249
(58) Field of Classification Search .................. None
See application file for complete search history.

(56) References Cited

U.S. PATENT DOCUMENTS

| 4,363,856 A * | 12/1982 | Waterhouse |
| 5,302,368 A | 4/1994 | Harato et al. |
| 5,342,709 A | 8/1994 | Yahnke et al. |
| 5,453,333 A * | 9/1995 | Takauchi et al. ................. 429/62 |
| 5,571,634 A * | 11/1996 | Gozdz et al. ................. 429/309 |
| 5,597,512 A | 1/1997 | Watanabe et al. |
| 5,882,721 A * | 3/1999 | Delnick |
| 5,928,812 A * | 7/1999 | Xue ............................ 429/304 |
| 5,948,464 A | 9/1999 | Delnick |
| 5,965,299 A | 10/1999 | Khan et al. |
| 6,053,953 A | 4/2000 | Tomiyama et al. |
| 6,080,507 A | 6/2000 | Yu |
| 6,084,767 A | 7/2000 | Day et al. |
| 6,110,619 A | 8/2000 | Zhang et al. |
| 6,235,427 B1 * | 5/2001 | Idota et al. |

(Continued)

FOREIGN PATENT DOCUMENTS

DE 103 04 735 A1 * 7/2004

(Continued)

OTHER PUBLICATIONS

Hubbard, Encyclopedia of Surface and Colloid Science, vol. 4: Por-A, Marcel Dekker, Inc., 2002, 4397-4398.*

(Continued)

*Primary Examiner* — Cynthia Lee
(74) *Attorney, Agent, or Firm* — McDermott Will & Emery LLP (57) ABSTRACT A secondary battery includes: a positive electrode; a negative electrode; a porous electron-insulating layer adhered to a surface of at least one selected from the group consisting of the positive electrode and the negative electrode; and an electrolyte. The porous electron-insulating layer comprises a particulate filler and a resin binder, and the particulate filler comprises an indefinite-shape particle comprising a plurality of primary particles that are joined to one another. A neck is preferably formed between the primary particles. Since the porous electron-insulating layer has high porosity, it is possible to obtain a secondary battery that exhibits excellent low-temperature characteristics, which are particularly important in actual use, and that is capable of discharging at a large current.

5 Claims, 2 Drawing Sheets

U.S. PATENT DOCUMENTS

| | | | |
|---|---|---|---|
| 6,287,720 | B1 | 9/2001 | Yamashita et al. |
| 6,296,969 | B1 | 10/2001 | Yano et al. |
| 6,387,564 | B1 | 5/2002 | Yamashita et al. |
| 6,638,988 | B2 | 10/2003 | Takata et al. |
| 6,664,007 | B2 | 12/2003 | Hamano et al. |
| 6,886,931 | B2 | 5/2005 | Yataka |
| 2002/0055038 | A1* | 5/2002 | Aihara et al. |
| 2002/0102456 | A1 | 8/2002 | Aihara et al. |
| 2003/0162090 | A1 | 8/2003 | Okada et al. |
| 2003/0170536 | A1* | 9/2003 | Aihara et al. |
| 2004/0166407 | A1* | 8/2004 | Nakajima et al. |
| 2004/0175621 | A1 | 9/2004 | Iriyama et al. |
| 2005/0214637 | A1 | 9/2005 | Imachi et al. |
| 2006/0046138 | A1 | 3/2006 | Hennige et al. |
| 2006/0188785 | A1 | 8/2006 | Inoue et al. |
| 2006/0216608 | A1* | 9/2006 | Ohata et al. |
| 2007/0042270 | A1 | 2/2007 | Ohata et al. |

FOREIGN PATENT DOCUMENTS

| | | | |
|---|---|---|---|
| EP | 0 809 314 A2 * | 11/1997 | |
| JP | 7-220759 | 8/1995 | |
| JP | 10-050287 | * 2/1998 | |
| JP | 10-106530 | 4/1998 | |
| JP | 10-241655 | 9/1998 | |
| JP | 10-334731 A | 12/1998 | |
| JP | 11-102730 | 4/1999 | |
| JP | 2000-100408 A | 4/2000 | |
| JP | 2000-309672 A | 11/2000 | |
| JP | 2003-115293 A | 4/2003 | |
| KR | 1999-028977 | * 4/1999 | |
| KR | 2001-0055897 | * 7/2001 | |
| WO | WO 2004/049472 A2 | 6/2004 | |
| WO | WO 2005/011043 A1 * | 2/2005 | |

OTHER PUBLICATIONS

Data sheet of fumed alumina: retrieved from http://www.cabot-corp.com/wcm/download/en-us/fs/SpectrAl%20100_0808.pdf> on Jan. 13, 2012.*

United States Office Action issued in U.S. Appl. No. 10/555,657 dated Dec. 9, 2009.

Kim et al. "Electrochemical and physical properties of composite polymer electrolyte of poly(methyl methacrylate) and poly(ethylene glycol diacylate)", Journal of Power Sources, 2003. 221-224. V. 124.

Thorsland, et al., "Characterization of Porous AlN Separators for Batteries," Mat. Res. Soc. Symp. Proc., 1996, pp. 315-321, vol. 431, Materials Research Society.

European Search Report issued in European Patent Application No. EP 1 667 254 A1.

Korean Office Action issued in corresponding Korean Patent Application No. KR 10-2005-7025256, dated Dec. 11, 2006.

European Search Report issued in European Patent Application No. 05720391.1-1227, dated Mar. 15, 2007.*

European Search Report issued in European Patent Application No. EP 05 70 9814, mailed Apr. 16, 2007.*

Morinaga et al. "Fabrication of Fine α-Alumina Powders by Thermal Decomposition of Ammonium Aluminum CArbonate Hydroxide (AACH)" ACTA Mettalurgica Inc., 2000, pp. 4735-4741.

US Office Action, issued in U.S. Appl. No. 11/314,008, dated on Jan. 11, 2008.

Translation of Patent JP 07-220759.

US Office Action, issued in U.S. Appl. No. 11/314,008, dated Apr. 28, 2008.

Walls et al., Fumed silica-based composite polymer electrolytes: synthesis, rheology, and electrochemistry, Journal of Power Sources 89(2000), pp. 156-162.

United States Office Action issued in U.S. Appl. No. 10/555,657, mailed Jun. 22, 2010.

United States Office Action issued in U.S. Appl. No. 11/663,810 dated Jul. 30, 2010.

Sigma Product Information for Fumed Silica.

United States Office Action issued in U.S. Appl. No. 11/283,604, dated Jun. 24, 2009.

Aguado, A., et al., "Calculation of the band gap energy of ionic crystals", Revista Mexicana De-Fisica, Dec. 1998, vol. 44 No. 6, pp. 550-558.

United States Office Action issued in U.S. Appl. No. 10/555,657 dated Mar. 30, 2011.

A.T. Hubbard, Encyclopedia of Surface and Colloid Science, vol. 4: Por-A, Marcel Dekker, Inc., 2002, 4397-4398.

Japanese Office Action issued in Japanese Patent Application No. 2005-517933, dated Sep. 22, 2011.

United States Office Action, issued in U.S. Appl. No. 10/555,657, dated Sep. 9, 2011.

The datasheet of Kynar Flex 2801, retrieved from <http://www.arkema-inc.com/literature/pdf/780.pdf>, on Sep. 2, 2011.

* cited by examiner

SECONDARY BATTERY

RELATED APPLICATIONS

This application is a Divisional of U.S. application Ser. No. 10/555,657, filed Nov. 4, 2005, which is a U.S. National Phase of PCT/JP2005/001762, filed Feb. 7, 2005, and claims priority of Japanese Application No. 2004-041106, filed Feb. 18, 2004, the entire contents of each of which are hereby incorporated by reference.

TECHNICAL FIELD

The present invention relates to a secondary battery, and, specifically, to improvements in the discharge characteristics of the secondary battery due to improvements in a porous electron-insulating layer adhered to an electrode surface.

BACKGROUND ART

Secondary batteries typically include a positive electrode, a negative electrode, and a separator sheet interposed therebetween. The separator sheet performs the functions of electronically insulating the positive electrode from the negative electrode, and holding an electrolyte. For example, conventional lithium-ion secondary batteries often include a microporous film, made of polyolefin, as the separator sheet. Also, a separator sheet comprising a polyolefin resin and an inorganic powder, or the like has been proposed (see Japanese Laid-Open Patent Publication No. Hei 10-50287). Such a separator sheet is usually produced by drawing a resin sheet that is obtained by a molding method, such as extrusion.

Recently, to improve the quality of secondary batteries, there has been a proposal to adhere a porous electron-insulating layer to an electrode surface (see Japanese Patent No. 3371301). The porous electron-insulating layer is formed on an electrode surface by applying a slurry comprising a particulate filler and a resin binder onto the electrode surface and drying the applied slurry with hot air. Although the porous electron-insulating layer is used as an alternative to a conventional separator sheet in some cases, it is used in combination with a conventional separator sheet in other cases.

Figure 3:
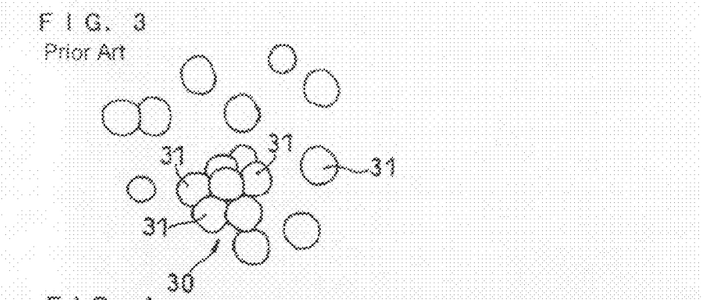
FIG. 3 is a schematic view of a conventional particulate filler.

The slurry comprising a particulate filler and a resin binder is usually prepared by mixing a particulate filler and a resin binder with a liquid component, and evenly dispersing the particulate filler in the liquid component by means of a dispersing device, such as a bead mill. As schematically shown in FIG. 3, a conventional particulate filler is composed mainly of spherical or substantially spherical primary particles 31, and a plurality of the primary particles 31 gather by weak van der Waals forces to form an agglomerated particle 30.

Conventionally, in terms of stabilizing the thickness and void ratio (porosity) of the porous electron-insulating layer, efforts have been made to break down the agglomeration of primary particles as much as possible by means of a dispersing device, such as a bead mill, in order to evenly disperse independent primary particles in a liquid component (see Japanese Laid-Open Patent Publication No. Hei 10-106530 (FIG. 2)).

DISCLOSURE OF THE INVENTION

Problem that the Invention is to Solve

When the porous electron-insulating layer is formed by applying a slurry in which mutually independent, spherical or substantially spherical primary particles are evenly dispersed onto an electrode surface and drying it with hot air, short-circuit or other problems in battery production are improved. However, mutually independent primary particles are likely to be filled into the porous electron-insulating layer at high densities, so that the porosity of the porous electron-insulating layer tends to lower. As a result, such secondary batteries have problems in that their high-rate charge/discharge characteristics and charge/discharge characteristics in a low temperature environment tend to become insufficient.

On the other hand, for example, the power source of cellular phones or notebook computers requires a considerable degree of high-rate charge/discharge characteristics and charge/discharge characteristics in a low temperature environment. Thus, application of conventional secondary batteries to the power source of such devices becomes difficult in some cases. Particularly in a low temperature environment at 0° C. or lower, the charge/discharge characteristics of conventional secondary batteries may lower markedly.

In view of the above, an object of the present invention is to improve the high-rate charge/discharge characteristics and low-temperature-environment charge/discharge characteristics of a secondary battery in which a porous electron-insulating layer is adhered to an electrode surface to improve battery safety.

Means for Solving the Problem

The present invention relates to a secondary battery including: a positive electrode; a negative electrode; a porous electron-insulating layer adhered to a surface of at least one selected from the group consisting of the positive electrode and the negative electrode; and an electrolyte. The porous electron-insulating layer comprises a particulate filler and a resin binder, and the particulate filler comprises an indefinite-shape particle comprising a plurality of primary particles that are joined to one another. As used herein, "indefinite-shape" refers to shapes having knots, bumps, or bulges based on the primary particles, that is, for example, shapes like dendrite, grape clusters or coral, unlike shapes that are spherical or egg-shaped, or that are similar to such shapes.

A neck is preferably formed between at least a pair of the primary particles that are joined to one another and that form the indefinite-shape particle. Specifically, the indefinite-shape particle is formed by partially melting a plurality of primary particles for bonding, for example, by heat treatment. The neck is formed when primary particles are bonded to one another by diffusion. It should be noted that a particle having a neck that is not clearly discernable due to sufficient progress of diffusion bonding can also be used as the indefinite-shape particle.

Preferably, the indefinite-shape particle has a mean particle size that is twice or more than twice the mean particle size of the primary particles and not more than 10 μm. More preferably, it has a mean particle size that is three times or more than three times the mean particle size of the primary particles and not more than 5 μm. Also, the primary particles preferably have a mean particle size of 0.05 to 1 μm.

The indefinite-shape particle preferably comprises a metal oxide. In this case, the particulate filler can further comprise a resin fine particle, such as a polyethylene fine particle.

The resin binder contained in the porous electron-insulating layer preferably comprises a polyacrylic acid derivative.

When the present invention is applied to a lithium ion secondary battery, it is preferred that the positive electrode comprise a composite lithium oxide and that the negative electrode comprise a material capable of charging and discharging lithium. Also, it is preferred to use a non-aqueous electrolyte comprising a non-aqueous solvent and a lithium salt dissolved in the non-aqueous solvent as the electrolyte.

The secondary battery of the present invention can further comprise a separator sheet independent of both the positive electrode and the negative electrode. The separator sheet may be a conventional separator sheet such as a micro-porous film made of polyolefin, without any particular limitation.

Effects of the Invention

The indefinite-shape particles according to the present invention each comprise a plurality of primary particles that are joined to one another. Thus, they do not easily become separated into independent primary particles, unlike agglomerated particles comprising a plurality of primary particles that gather by van der Waals forces. The use of such indefinite-shape particles prevents a particulate filler from being filled into a porous electron-insulating layer at high densities. Therefore, it becomes possible to easily form a porous electron-insulating layer with a porosity much higher than the conventional one, thereby enabling a significant improvement in the high-rate charge/discharge characteristics and low-temperature-environment charge/discharge characteristics of secondary batteries.

The indefinite-shape particles each comprising a plurality of primary particles that are joined to one another have complicated three-dimensional structures. Thus, in forming the porous electron-insulating layer, the interaction of the indefinite-shape particles is considered to prevent the particulate filler from being filled at high densities.

The indefinite-shape particles each comprising a plurality of primary particles that are joined to one another can maintain their shapes with a high probability even if they are subjected to a strong shearing force by a dispersing device in a step of dispersing them in a liquid component to form a slurry. Hence, a porous electron-insulating layer with a high porosity can be formed stably.

Also, the present invention can provide a secondary battery that is excellent in high-rate charge/discharge characteristics, low-temperature-environment charge/discharge characteristics, and safety at low costs.

BEST MODE FOR CARRYING OUT THE INVENTION

A secondary battery of the present invention includes a positive electrode, a negative electrode, a porous electron-insulating layer adhered to a surface of at least one electrode selected from the group consisting of the positive electrode and the negative electrode, and an electrolyte. While the present invention is preferably applied to lithium-ion secondary batteries, it is also applicable to other various secondary batteries, for example, alkaline storage batteries.

The present invention includes all the cases where the porous electron-insulating layer is interposed between the positive electrode and the negative electrode. Specifically, the present invention includes a case where the porous electron-insulating layer is adhered only to a positive electrode surface, a case where it is adhered only to a negative electrode surface, and a case where it is adhered to both a positive electrode surface and a negative electrode surface. Also, the present invention includes a case where the porous electron-insulating layer is adhered only to one side of the positive electrode, a case where it is adhered to both sides of the positive electrode, a case where it is adhered only one side of the negative electrode, and a case where it is adhered to both sides of the negative electrode.

Figure 1:
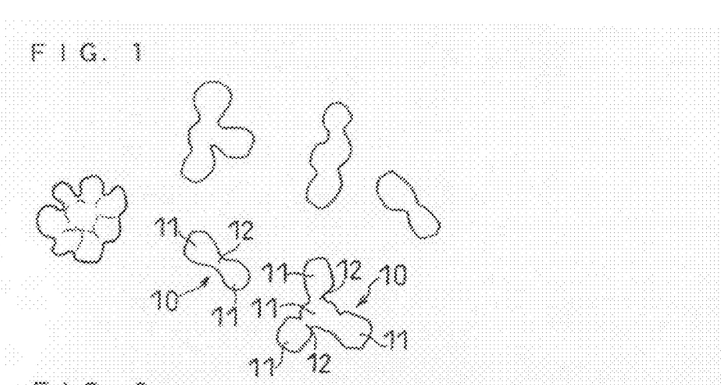
FIG. 1 is a schematic view of indefinite-shape particles each comprising a plurality of primary particles that are joined to one another according to the present invention.

The porous electron-insulating layer comprises a particulate filler and a resin binder, and the particulate filler comprises indefinite-shape particles each comprising a plurality of primary particles (e.g., about 2 to 10 particles, preferably 3 to 5 particles) that are joined to one another. FIG. 1 schematically shows exemplary indefinite-shape particles. Indefinite-shape particles 10 each comprise a plurality of primary particles 11 that are joined to one another, and a neck 12 is formed between a pair of the primary particles that are joined to one another. Generally, primary particles are composed of single crystal, so the indefinite-shape particles 10 are inevitably polycrystalline particles. That is, the indefinite-shape particles are polycrystalline particles, and the polycrystalline particles each comprise a plurality of primary particles that are bonded by diffusion.

The indefinite-shape particles each comprising a plurality of primary particles that are joined to one another can be produced, for example, by heating a conventional particulate filler, i.e., a particulate filler comprising mutually independent primary particles or agglomerated primary particles by van der Waals forces, so as to partially melt the primary particles and bond the primary particles to one another. The indefinite-shape particles thus obtained are not easily disintegrated into independent primary particles even upon application of a shearing force thereto.

It should be noted that even if a mechanical shearing force is applied onto a conventional particulate filler, it is difficult to join a plurality of primary particles to one another. Also, it has been confirmed that even if primary particles are agglomerated by using a binder, the primary particles become separated into independent primary particles upon preparation of a slurry.

While the porous electron-insulating layer also has an action similar to that of a conventional separator sheet, it is largely different in structure from a conventional separator sheet. Unlike a micro-porous film that is obtained by drawing a resin sheet or the like, the porous electron-insulating layer has a structure in which particles of a particulate filler are bonded together with a resin binder. Therefore, the tensile strength of the porous electron-insulating layer in the plane direction thereof is lower than that of a separator sheet. However, the porous electron-insulating layer is superior in that even upon exposure to high temperatures, it does not shrink due to heat, unlike a separator sheet. In the event of an internal short-circuit or upon exposure of a battery to high temperatures, the porous electron-insulating layer has the actions of preventing expansion of the short-circuit, preventing abnormal heating, and enhancing the safety of the secondary battery.

The porous electron-insulating layer has pores through which a suitable amount of non-aqueous electrolyte is passed. In a secondary battery with an electrode having a porous electron-insulating layer adhered to the surface, the large current behavior thereof in a low temperature environment, for example, the discharge characteristics at a current value of 2 hour rate (2C) in a 0° C. environment depend on the porosity of the porous electron-insulating layer (the ratio of the pore volume to the porous electron-insulating layer).

The porosity of the porous electron-insulating layer can be measured, for example, in the following manner.

First, a particulate filler, a resin binder, and a liquid component are mixed together to prepare a slurry of raw materials for a porous electron-insulating layer. The liquid component is selected as appropriate, depending on the kind, etc., of the resin binder. For example, an organic solvent, such as N-methyl-2-pyrrolidone or cyclohexanone, or water can be used. The dispersing device used for preparing the raw material slurry is preferably a device capable of applying a shearing force such that the indefinite-shape particles are not disintegrated into primary particles. Preferable examples include, but are not limited to, a medialess dispersing device and a bead mill with mild conditions.

The resultant slurry is passed through a filter of a suitable mesh size. It is then applied onto a base material made of, for example, metal foil so as to achieve a predetermined thickness with a doctor blade, followed by drying. The film formed on the base material is thought to have the same structure as that of the porous electron-insulating layer adhered to the electrode surface. Thus, the porosity of the film formed on the base material can be regarded as the porosity of the porous electron-insulating layer.

The porosity (P) of the film formed on the base material can be obtained based on the apparent volume (Va) and the true volume (Vt) of the film, i.e., from the calculation formula: $P(\%) = \{100 \times (Va - Vt)\}/Va$.

The apparent volume Va of the film corresponds to the product (S×T) of the thickness (T) of the film and the upper surface area (S) of the film. Also, the true volume (Vt) of the film can be calculated from the weight (W) of the film, the true density (Df) of the particulate filler, the true density (Db) of the resin binder, and the weight ratio between the particulate filler and the resin binder in the film.

For example, when the weight ratio between the particulate filler and the resin binder is x:(1−x), the true volume Vt of the film corresponds to the sum of the true volume (xW/Df) of the particulate filler and the true volume $\{(1-x)W/Db\}$ of the resin binder.

In the case of using the conventional particulate filler as illustrated in FIG. 3, upon the dispersion treatment for preparing a slurry, the agglomerated particle 30 easily becomes separated into independent primary particles 31. Consequently, the porosity P of the resultant porous electron-insulating layer is usually a low value less than 45%, and it is difficult to form a porous electron-insulating layer with a higher porosity. Secondary batteries having such a low-porosity porous electron-insulating layer have insufficient high-rate charge/discharge characteristics and low-temperature charge/discharge characteristics.

On the other hand, in the case of using the indefinite-shape particles 10 each comprising a plurality of the primary particles 11 that are joined to one another, as illustrated in FIG. 1, the resultant porous electron-insulating layer can easily achieve a porosity P of 45% or more, or further, 50% or more. The achievement of such high porosities is not dependent on the material of the particulate filler. Therefore, as long as the shape, particle size distribution, etc., of the indefinite-shape particles are essentially the same, the use of any of, for example, titanium oxide (titania), aluminum oxide (alumina), zirconium oxide (zirconia), and tungsten oxide results in achievement of essentially the same high porosities.

In applying the present invention to lithium-ion secondary batteries, the maximum particle size of the primary particles is preferably 4 μm or less, and more preferably 1 μm or less. If the primary particles of an indefinite-shape particle are not clearly discernable, the thickest parts of the knots of the indefinite-shape particle can be regarded as the particle size of the primary particles.

If the primary particle size exceeds 4 μm, it may become difficult to ensure the porosity of the resultant porous electron-insulating layer or to bend the electrode plate.

The maximum particle size of the primary particles can be determined, for example, by measuring the particle sizes of at least 1000 primary particles in an SEM photo or a transmission electron microscope (TEM) photo of indefinite-shape particles and obtaining their maximum value. Also, when indefinite-shape particles are produced by subjecting primary particles to a heat-treatment to partially melt them for bonding, the maximum particle size of the raw material primary particles can be regarded as the maximum particle size of the primary particles constituting the indefinite-shape particles. This is because such a heat treatment just for promoting the diffusion bonding of the primary particles hardly changes the particle size of the primary particles. The maximum particle size of the raw material primary particles can be measured, for example, by a wet laser particle size distribution analyzer available from Microtrack Inc.

In measuring the particle size distribution of raw material primary particles of indefinite-shape particles by a wet laser particle size distribution analyzer or the like, the volume-basis 99% value ($D_{99}$) of the primary particles can be regarded as the maximum particle size of the primary particles.

The mean particle size of the primary particles can also be measured in the above manner. That is, for example, using an SEM photo or a transmission electron microscope (TEM) photo of indefinite-shape particles, the particle sizes of at least 1000 primary particles are measured, and then their average value is obtained. Alternatively, the particle size distribution of raw material primary particles of indefinite-shape particles is measured by a wet laser particle size distribution analyzer or the like, and the volume basis 50% value (median value: $D_{50}$) of the primary particles can be regarded as the mean particle size of the primary particles.

The mean particle size of the indefinite-shape particles is desirably twice or more than twice the mean particle size of the primary particles (preferably 0.05 μm to 1 μm) and not more than 10 μm. Also, from the viewpoint of obtaining a stable porous electron-insulating layer that is capable of maintaining a high porosity over a long period of time, the mean particle size of the indefinite-shape particles is more preferably three times or more than three times the mean particle size of the primary particles and not more than 5 μm.

The mean particle size of the indefinite-shape particles can be measured, for example, by a wet laser particle size distribution analyzer available from Microtrack Inc. In this case, the volume basis 50% value (median value: $D_{50}$) of indefinite-shape particles can be regarded as the mean particle size of the indefinite-shape particles. If the mean particle size of the indefinite-shape particles is less than twice the mean particle size of the primary particles, the resultant porous electron-insulating layer may have a closely packed structure. If it exceeds 10 μm, the porosity of the resultant porous electron-insulating layer becomes excessively high (e.g., more than 80%), so that its structure may become brittle.

In the case of lithium-ion secondary batteries, the thickness of the porous electron-insulating layer is not to be particularly limited; however, for example, it is desirably 20 μm or less.

The raw material slurry for the porous electron-insulating layer is applied onto an electrode surface by a die nozzle method, a blade method, or the like. In applying the raw material slurry for the porous electron-insulating layer onto an electrode surface, if the mean particle size of the indefinite-shape particles is large, large particles are likely to be caught, for example, in the gap between the electrode surface and the blade tip, so that the resultant film may be streaked, thereby resulting in a decrease in production yields. Therefore, in terms of production yields, also, the mean particle size of the indefinite-shape particles is desirably 10 μm or less.

In the present invention, primary particles of a metal oxide are preferably used to produce indefinite-shape particles. Exemplary metal oxides forming the particulate filler include titanium oxide, aluminum oxide, zirconium oxide, tungsten oxide, zinc oxide, magnesium oxide, and silicon oxide. They may be used singly or in combination with two or more of them. Among them, particularly in terms of chemical stability, aluminum oxide (alumina) is preferable, and α-alumina is particularly preferable.

The particulate filler can contain resin fine particles. Since resin fine particles have a specific gravity of approximately 1.1 and are therefore much more lightweight than metal oxides having a specific gravity of around 4, they are effective in reducing the weight of secondary batteries. As the resin fine particles, for example, polyethylene fine particles can be used.

However, the use of resin fine particles increases production costs. Hence, in terms of production costs, it is desired to use a metal oxide alone, or, in the case of using resin fine particles, to make the ratio of the resin fine particles to the whole particulate filler 50% or less by weight.

The material constituting the resin binder contained in the porous electron-insulating layer is not to be particularly limited, and examples include polyacrylic acid derivatives, polyvinylidene fluoride (PVDF), polyethylene, styrene-butadiene rubber, polytetrafluoroethylene (PTFE), and tetrafluoroethylene-hexafluoropropylene copolymer (FEP). They may be used singly or in combination with two or more of them.

Alkaline storage batteries and lithium-ion secondary batteries predominantly use an electrode group obtained by winding a positive electrode and a negative electrode. However, in order to form such an electrode group having a wound structure, the porous electron-insulating layer to be adhered to the electrode surface needs to be flexible. From the viewpoint of imparting such flexibility to the porous electron-insulating layer, it is desirable to use a polyacrylic acid derivative as the resin binder.

In the porous electron-insulating layer, the ratio of the resin binder to the total of the particulate filler and the resin binder is preferably 1 to 10% by weight, and more preferably 2 to 4% by weight.

In applying the present invention to lithium-ion secondary batteries, it is preferred that the positive electrode comprise a composite lithium oxide, that the negative electrode comprise a material capable of charging and discharging lithium, and that the electrolyte comprise a non-aqueous electrolyte including a non-aqueous solvent and a lithium salt dissolved therein.

As the composite lithium oxide, for example, a lithium-containing transition metal oxide, such as lithium cobaltate, lithium nickelate, or lithium manganate, is preferably used. Also, a modified lithium-containing transition metal oxide in which a part of the transition metal is replaced with another element is preferably used. For example, the cobalt of lithium cobaltate is preferably replaced with an element such as aluminum or magnesium, and the nickel of lithium cobaltate is preferably replaced with cobalt. Such composite lithium oxides may be used alone or in combination with two or more of them.

Exemplary negative electrode materials capable of charging and discharging lithium include various natural graphites, various artificial graphites, silicon composite materials, and various alloy materials. These materials may be used singly or in combination with two or more of them.

With respect to the non-aqueous solvent, there is no particular limitation, and examples include carbonic acid esters such as ethylene carbonate (EC), propylene carbonate (PC), dimethyl carbonate (DMC), diethyl carbonate (DEC), and ethyl methyl carbonate (EMC); carboxylic acid esters such as γ-butyrolactone, γ-valerolactone, methyl formate, methyl acetate, and methyl propionate; and ethers such as dimethyl ether, diethyl ether, and tetrahydrofuran. Such non-aqueous solvents may be used singly or in combination with two or more of them. Among them, particularly carbonic acid esters are preferably used.

With respect to the lithium salt, there is no particular limitation, and for example, $LiPF_6$, $LiBF_4$, or the like is preferably used. They may be used singly or in combination with two or more of them.

In order to ensure stability upon overcharge, it is preferred to add to the non-aqueous electrolyte a small amount of an additive that forms a satisfactory film on the positive electrode and/or the negative electrode, for example, vinylene carbonate (VC), vinyl ethylene carbonate (VEC), cyclohexyl benzene (CHB), or the like.

The secondary battery of the present invention can further include a separator independent of the positive electrode and the negative electrode, in addition to the porous electron-insulating layer. As the separator, a conventional separator sheet such as a polyolefin micro-porous film can be used without any particular limitation. In the case of not using a conventional separator sheet, the porous electron-insulating layer performs the function of the separator. In this case, secondary batteries can be provided at low costs.

In the case of not using a conventional separator sheet in lithium-ion secondary batteries, the thickness of the porous electron-insulating layer is preferably 1 to 20 μm. Also, when using a conventional separator sheet (preferable thickness: 5 to 20 μm) in addition to the porous electron-insulating layer, the thickness of the porous electron-insulating layer is preferably 1 to 15 μm.

The separator sheet needs to be composed of a material that is resistant to the environment inside the secondary battery. Typically, a micro-porous film made of a polyolefin resin, such as polyethylene or polypropylene, is used. The use of a separator sheet makes a short-circuit unlikely to occur, thereby resulting in improvements in safety and reliability of the secondary battery.

The present invention is hereinafter described by way of examples, regarding the production of a lithium-ion secondary battery using a particulate filler comprising aluminum oxide. These examples, however, are merely examples of the secondary battery of the present invention and are not to be construed as limiting in any way the present invention.

Example 1

(i) Preparation of Particulate Filler Comprising Indefinite-Shape Particles (a) Primary particles of aluminum oxide (alumina) with a mean particle size of 0.1 μm, which were the raw material of indefinite-shape particles, were heated at a temperature of 1100° C. in air for 20 minutes, to produce indefinite-shape particles each comprising a plurality of primary particles joined to one another. The size of the resultant indefinite-shape particles was adjusted by using 15-mm-diameter alumina balls and a wet ball mill, to produce a particulate filler A1 with a mean particle size of 0.5 µm.

(b) Primary particles of titanium oxide (titania) with a mean particle size of 0.2 µm, which were the raw material of indefinite-shape particles, were heated at a temperature of 800° C. in air for 20 minutes, to produce indefinite-shape particles each comprising a plurality of primary particles joined to one another. The size of the resultant indefinite-shape particles was adjusted in the same manner as the particulate filler A1, to produce a particulate filler A2 with a mean particle size of 0.5 µm.

(c) Primary particles of aluminum oxide (alumina) with a mean particle size of 0.5 µm were used as a particulate filler B1 as they were.

(d) A mechanical shearing force was applied onto primary particles of aluminum oxide (alumina) with a mean particle size of 0.1 µm by a vibration mill equipped with a 40-mm-diameter alumina bar, to produce a particulate filler B2 comprising agglomerated particles with a mean particle size of 0.5 µm.

(e) Primary particles of aluminum oxide (alumina) with a mean particle size of 0.1 µm were mixed with 4% by weight of polyvinylidene fluoride (PVDF), to produce a particulate filler B3 comprising agglomerated particles with a mean particle size of 0.5 µm.

(ii) Preparation of Raw Material Slurry for Porous Electron-Insulating Layer (a) 100 parts by weight of the particulate filler A1, 4 parts by weight of a polyacrylic acid derivative (the solid content of BM720H available from Zeon Corporation) (resin binder), and a suitable amount of N-methyl-2-pyrrolidone (liquid component) were mixed together with a stirring device, to form a mixture having a nonvolatile component content of 60% by weight. This mixture was placed into a bead mill with an internal volume of 0.6 L, together with 3-mm-diameter zirconia beads in an amount corresponding to 80% by volume of the internal volume. By operating the bead mill, the particulate filler A1 was evenly dispersed in the liquid component, to form a slurry A1.

(b) Slurries A2, B1, B2 and B3 were prepared in the same manner as the slurry A1, except for the use of the particulate fillers A2, B1, B2 and B3, respectively, instead of the particulate filler A1.

(iii) Porosity of Porous Electron-Insulating Layer (a) The slurry A1 was applied onto a metal foil with a doctor blade such that the resultant film (porous electron-insulating layer A1) had a thickness of approximately 20 µm when dried. The apparent volume Va of this film was obtained from the thickness (T) of the film and the upper surface area (S) of the film, and further, the true volume (Vt) of the film was calculated from the weight (W) of the film, the true density (Df) of the particulate filler, the true density (Db) of the resin binder, and the weight ratio between the particulate filler and the resin binder in the film.

Figure 2:
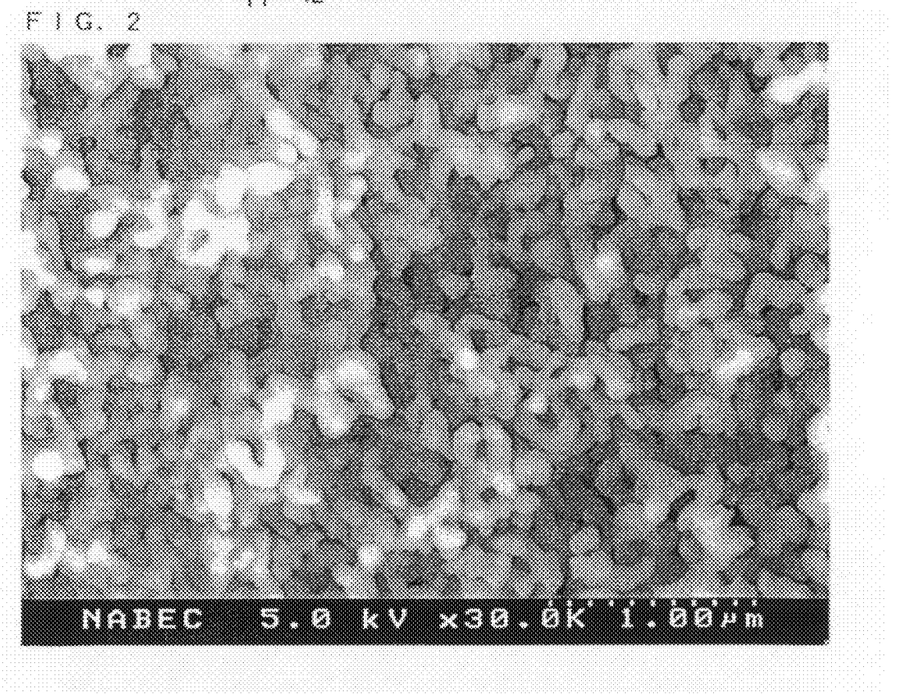
FIG. 2 is a scanning electron microscope (SEM) photo of a porous electron-insulating layer according to one example of the present invention.

The porosity (P) of the film was obtained from the calculation formula: $P(\%) = \{100 \times (Va - Vt)\}/Va$, and it was 60%. Also, the film, i.e., the upper surface of the porous electron-insulating layer A1 was observed through an SEM, and an SEM photo as shown in FIG. 2 was taken. FIG. 2 reveals that large pores are formed in the porous electron-insulating layer A1 that is filled with indefinite-shape particles comprising a plurality of primary particles joined to one another.

Figure 4:
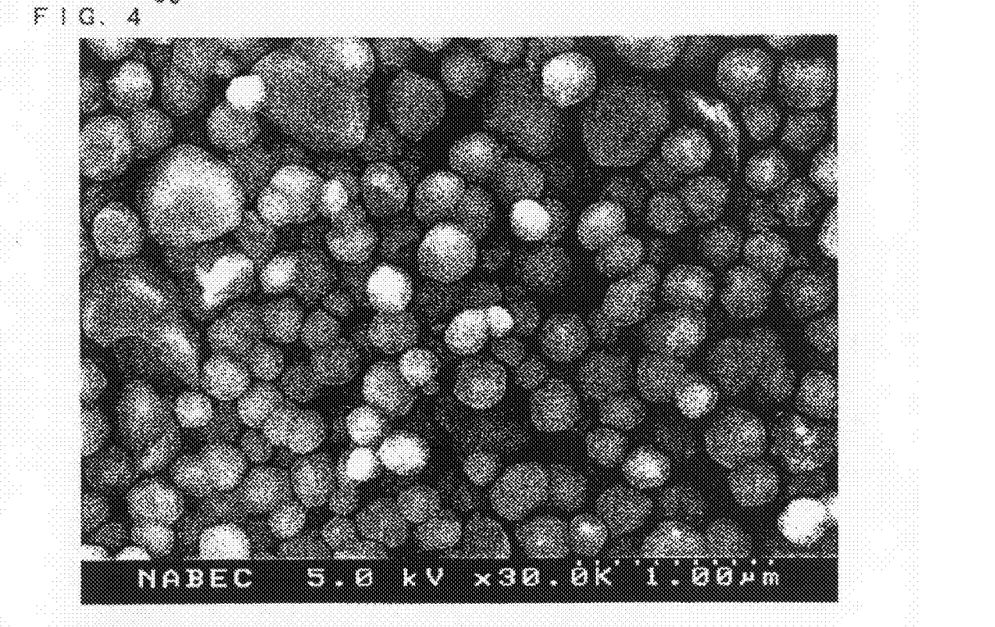
FIG. 4 is an SEM photo of a porous electron-insulating layer according to one comparative example of the present invention.

(b) Porous electron-insulating layers A2, B1, B2 and B3 were formed by using the slurries A2, B1, B2 and B3, respectively, instead of the slurry A1, and their porosities were determined. The porosities of the porous electron-insulating layers A2, B1, B2 and B3 were 58%, 44%, 45% and 44%, respectively. Also, the upper surface of the porous electron-insulating layer B1 was observed through an SEM, and an SEM photo as shown in FIG. 4 was taken. FIG. 4 reveals that the porous electron-insulating layer B1 is filled with independent primary particles at a high density and that large pores are not formed therein.

Table 1 shows the results.

TABLE 1

| Porous electron-insulating layer | Particulate filler | Primary particle size (µm) | Secondary particle size * (µm) | Porosity (%) |
|---|---|---|---|---|
| A1 | Almina dendrite particles | 0.1 | 0.5 | 60 |
| A2 | Titania dendrite particles | 0.1 | 0.5 | 58 |
| B1 | Alumina primary particles | 0.5 | — | 44 |
| B2 | Alumina agglomerated particles (shearing force) | 0.1 | 0.5 | 45 |
| B3 | Alumina agglomerated particles (addition of PVDF) | 0.1 | 0.5 | 44 |

* Secondary particles: dendrite particles or agglomerated particles

The above results clearly indicate that the porous electron-insulating layers using the particulate fillers comprising indefinite-shape particles clearly have higher porosities than those using the particulate fillers comprising independent primary particles or agglomerated particles. They also indicate that the degree of porosity is hardly influenced by the material constituting the particulate filler (kind of oxides).

An SEM photo has confirmed that in the case of using the particulate filler B2 comprising the primary particles that were agglomerated by the application of the mechanical shearing force with the vibration mill, the porosity of the porous electron-insulating layer is low and that the agglomerated particles became disintegrated into primary particles in the porous electron-insulating layer B2. Also, an SEM photo has confirmed that in the case of the particulate filler B3 comprising the primary particles that were agglomerated by the addition of PVDF, the agglomerated particles also became disintegrated into primary particles in the porous electron-insulating layer B3. The reason is probably that upon the preparation of the slurry, the agglomerated particles are subjected to the shearing force in the bead mill.

On the other hand, it can be understood that even if the indefinite-shape particles are subjected to the shearing force in the bead mill, they can substantially maintain their shapes without causing the primary particles to get separated, and that for this reason the high porosities were achieved.

(iv) Production of Lithium-Ion Secondary Battery

Using the slurries A1, A2 and B1, lithium-ion secondary batteries with a porous electron-insulating layer adhered to each side of the negative electrode were produced, and their charge/discharge characteristics were evaluated.

(Negative Electrode Production)

3 kg of artificial graphite (negative electrode active material), 75 g of rubber particles composed of a styrene-butadiene copolymer (negative electrode binder), 30 g of carboxymethyl cellulose (CMC: thickener), and a suitable amount of water were stirred by a double-arm kneader, to form a negative electrode mixture paste. This paste was applied onto both sides of a 10-μm thick copper foil and then dried, to produce a negative electrode sheet. This negative electrode sheet was rolled such that the total thickness was 180 μm and the active material layer density was 1.4 g/cm$^3$.

(Positive Electrode Production)

3 kg of lithium cobaltate (LiCoO$_2$: positive electrode active material), 120 g of PVDF (positive electrode binder), 90 g of acetylene black (positive electrode conductive agent), and a suitable amount of N-methyl-2-pyrrolidone (NMP) were stirred by a double-arm kneader, to produce a positive electrode mixture paste. This paste was applied onto both sides of a 15-μm thick aluminum foil and then dried, to form a positive electrode sheet. This positive electrode sheet was rolled such that the total thickness was 160 μm and the active material layer density was 3.3 g/cm$^3$.

(Battery Assembly)

The slurry A1 was applied onto both sides of the rolled negative electrode sheet and then dried, to form 5-μm thick porous electron-insulating layers. Thereafter, the negative electrode sheet with the porous electron-insulating layers adhered to both sides thereof was cut into a predetermined width such that it could be inserted into a cylindrical battery can of size 18650, to produce a negative electrode of predetermined size. Also, the rolled positive electrode sheet was cut into a predetermined width such that it could be inserted into a cylindrical battery can of size 18650, to produce a positive electrode of predetermined size.

The positive electrode and the negative electrode with the porous electron-insulating layers adhered to both sides thereof were wound with a 15-μm thick separator sheet made of polyethylene resin interposed therebetween, to form an electrode group. This electrode group was inserted into the cylindrical battery can of size 18650, and 5 g of a non-aqueous electrolyte was injected therein.

The non-aqueous electrolyte used was prepared by dissolving LiPF$_6$ at a concentration of 1 mol/L in a solvent mixture of ethylene carbonate, dimethyl carbonate, and ethyl methyl carbonate in a volume ratio of 2:3:3 and further dissolving 3% by weight of vinylene carbonate.

Thereafter, the battery can was sealed, to complete a lithium-ion secondary battery A1 with a design capacity of 2000 mAh. Also, lithium-ion secondary batteries A2 and B1 were produced in the same manner as the battery A1, except for the use of the slurries A2 and B1, respectively, instead of the slurry A1.

(v) Battery Evaluation

The lithium-ion secondary batteries A1, A2 and B1 thus produced were subjected to a preliminary charge/discharge twice and stored in a 45° C. environment for 7 days. Thereafter, they were charged and discharged in a 20° C. environment in the following conditions.
(1) Constant current discharge: 400 mA (cut-off voltage 3 V)
(2) Constant current charge: 1400 mA (cut-off voltage 4.2 V)
(3) Constant voltage charge: 4.2 V (cut-off current 100 mA)
(4) Constant current discharge: 400 mA (cut-off voltage 3 V)
(5) Constant current charge: 1400 mA (cut-off voltage 4.2 V)
(6) Constant voltage charge: 4.2 V (cut-off current 100 mA)

After the above-mentioned charges and discharges, the respective batteries were allowed to stand for 3 hours. Thereafter, they were charged and discharged in a 0° C. environment as follows.
(7) Constant current discharge: 4000 Ma (cut-off voltage 3 V)

The discharge capacities obtained were designated as 0° C.-2C discharge characteristics. Table 2 shows the 0° C.-2C discharge characteristics of the respective batteries.

TABLE 2

| Slurry | Particulate filler | 0° C.-2 C. discharge characteristics (mAh) |
|---|---|---|
| A1 | Alumina dendrite particles | 1820 |
| A2 | Titania dendrite particles | 1780 |
| B1 | Alumina primary particles | 1590 |

The above results indicate that the batteries with the high-porosity porous electron-insulating layers exhibit excellent low-temperature discharge characteristics. On the other hand, the battery with the low-porosity porous electron-insulating layers having no indefinite-shape particles exhibits a significant decrease in low-temperature discharge characteristics.

Example 2

The slurry prepared is subjected to a step of refinement by a filter and the like before being used for forming a porous electron-insulating layer. Thus, in order to stabilize the physical properties of the porous electron-insulating layer, it is desired that the sedimentation of the particulate filler hardly proceeds for several days after the preparation of the slurry. The present inventors have found that the degree of sedimentation is dependent on the mean particle size of primary particles of a particulate filler. Hence, this example explains the relationship between the mean particle size of primary particles of a particulate filler and the degree of sedimentation.

Indefinite-shape particles comprising a plurality of primary particles joined to one another were produced in the same manner as the particulate filler A1 of Example 1, except that the mean particle size of primary particles of aluminum oxide as the raw material of the indefinite-shape particles was changed from 0.1 μm to 0.01 μm, 0.05 μm, 0.3 μm, 0.5 μm, 1 μm, 2 μm, 3 μm or 4 μm. The size of the resultant indefinite-shape particles was adjusted to produce particulate fillers C1, C2, C3, C4, C5, C6, C7 and C8 with mean particle sizes of 0.03 μm, 0.16 μm, 0.8 μm, 1.3 μm, 2.5 μm, 6 μm, 8 μm and 10 μm, respectively.

Slurries C1, C2, C3, C4, C5, C6, C7 and C8 were prepared in the same manner as the slurry A1, except for the use of the particulate fillers C1, C2, C3, C4, C5, C6, C7 and C8, respectively, instead of the particulate filler A1. The resultant slurries were allowed to stand in a 25° C. environment, and the degree of sedimentation was visually observed every day.

As a result, in the slurries C1 to C5 having the mean particle sizes of primary particles of 0.01 to 1 μm, little sedimentation of the particulate filler was found after 4 days or more. On the other hand, in the slurries C6 to C8 having the mean particle sizes of primary particles of 1 μm or more, sedimentation of the particulate filler was observed within 1 day.

The particle size distributions of the primary particles used as the raw materials of the particulate fillers C1 to C5 were measured, and their maximum particle sizes ($D_{99}$) were all found to be 3 μm or less. On the other hand, the particle size distributions of the primary particles used as the raw materials of the particulate fillers C6 to C8 were measured, and their maximum particle sizes ($D_{99}$) were all found to be larger than 3 μm.

Lithium-ion secondary batteries C1 to C5 were produced in the same manner as in the Example 1, except for the use of the slurries C1 to C5, respectively, and their 0° C.-2C discharge characteristics were evaluated. As a result, they were all found to be 1750 mAh or more, being significantly better than the battery B1.

Example 3

Indefinite-shape particles comprising a plurality of primary particles joined to one another were produced in the same manner as the particulate filler A1 of Example 1, except that the mean particle size of primary particles of aluminum oxide used as the raw material of the indefinite-shape particles was changed from 0.1 μm to 0.2 μm. However, the size of the indefinite-shape particles was varied, to produce particulate fillers D1, D2, D3, D4, D5, D6, D7, D8, D9 and D10 with mean particle sizes of 0.3 μm, 0.4 μm, 0.5 μm, 0.7 μm, 1.2 μm, 3 μm, 8 μm, 10 μm, 12 μm and 15 μm, respectively.

The size of the indefinite-shape particles was adjusted by using a wet ball mill equipped with 3-mm-diameter alumina balls occupying 30% of the internal volume. The mean particle size of the indefinite-shape particles was varied by varying the operation time of the ball mill.

Slurries D1, D2, D3, D4, D5, D6, D7, D8, D9 and D10 were prepared in the same manner as the slurry A1, except for the use of the particulate fillers D1, D2, D3, D4, D5, D6, D7, D8, D9 and D10, respectively, instead of the particulate filler A1.

Each slurry was applied onto a metal foil with a common blade coater. The intended thickness of the film was 20 μm. As a result, the slurries D1 to D8, in which the mean particle sizes of the indefinite-shape particles were 10 μm or less, resulted in films having a smooth surface. On the other hand, in the case of using the slurries D9 and D10, in which the mean particle sizes of the indefinite-shape particles were larger than 10 μm, the surfaces of the resultant films were streaked with a high frequency, thereby leading to a large decline in production yields.

Next, lithium-ion secondary batteries D1 to D8 were produced in the same manner as in Example 1, except for the use of the slurries D1 to D8, respectively, and their 0° C.-2C discharge characteristics were evaluated. As a result, they were all found to be 1750 mAh or more, being significantly superior to the battery B1.

Also, with respect to the 0° C.-2C discharge characteristics, the results of the batteries D2 to D5 were particularly good, and the results of the batteries D3 and D4 were more particularly good. Accordingly, the mean particle size of the indefinite-shape particles is preferably about 2 to 6 times the mean particle size of the primary particles, and most preferably about 2.5 to 3.5 times.

Example 4

The most common structure of the electrode group of secondary batteries is a structure of winding a positive electrode and a negative electrode with a separator sheet therebetween. Thus, if the porous electron-insulating layer is hard, the porous electron-insulating layer may become cracked or separated from the electrode surface. Hence, this example describes the case where the flexibility of the porous electron-insulating layer is changed.

A slurry E1 was prepared in the same manner as the slurry A1 of Example 1, except for the use of polyvinylidene fluoride (PVDF) instead of the polyacrylic acid derivative. Using this slurry, 500 batteries were produced in the same manner as the battery A1 of Example 1. Also, 500 batteries A1 of Example 1 were produced.

The inter-terminal voltages of the respective batteries were measured to check the presence or absence of an internal short-circuit. As a result, the short-circuit incidence of the batteries E1 was 10%, which was high, but the short-circuit incidence of the batteries A1 was 0.4%. The short-circuit incidence of conventional lithium-ion secondary batteries is 0.5% or less. The short-circuited batteries E1 were disassembled, and the states of their porous electron-insulating layers containing PVDF as the resin binder were observed. As a result, many cracks were found, and cracking particularly near the center of the electrode group was remarkable.

On the other hand, the batteries A1 were disassembled, and the states of their porous electron-insulating layers containing the polyacrylic acid derivative as the resin binder were observed. As a result, no cracking was found. The above results indicate that while PVDF yields relatively hard porous electron-insulating layers, the polyacrylic acid derivative yields highly flexible porous electron-insulating layers.

Example 5

A battery F1 was produced in the same manner as the battery A1 of Example 1, except that the thickness of the porous electron-insulating layer on each side of the negative electrode was changed from 5 μm to 20 μm and that the polyethylene resin separator sheet was not used.

The 0° C.-2C discharge characteristics of the battery F1 were evaluated, and it was found that 1750 mAh was achieved. This confirmed that the battery F1 had excellent low-temperature discharge characteristics equivalent to those of battery A1. It should be noted that the battery F1 does not need a conventional expensive separator sheet, thereby making the production cost low, which holds great industrial promise.

INDUSTRIAL APPLICABILITY

The present invention is applicable to various secondary batteries including lithium ion secondary batteries, and is particularly effective in lithium ion secondary batteries that require both high low-temperature discharge characteristics and high-rate discharge characteristics as well as high safety. Since lithium ion secondary batteries have a large market, the present invention can play a significant role in improving product performance and safety.

The invention claimed is:

1. A secondary battery comprising: a positive electrode; a negative electrode; a porous electron-insulating layer adhered to a surface of at least one selected from the group consisting of said positive electrode and said negative electrode; and an electrolyte, wherein said porous electron-insulating layer comprises a particulate filler and a resin binder, and said particulate filler substantially comprises indefinite-shape particles, wherein said indefinite-shape particles comprise a plurality of single crystalline primary particles, said single crystalline primary particles having a mean particle size of 0.1 to 1.0 μm, bonded to each other and a neck formed, by partially melting said plurality of single crystalline primary particles, between at least a pair of said single crystalline primary particles that are joined to one another, said neck comprising the same material as said single crystalline primary particles, wherein said indefinite-shape particles comprise a metal oxide.

2. The secondary battery in accordance with claim 1, wherein said indefinite-shape particles have a mean particle size that is twice or more than twice the mean particle size of said single crystalline particles and not more than 10 μm.

3. The secondary battery in accordance with claim 1, wherein said particulate filler further comprises resin particles.

4. The secondary battery in accordance with claim 1, wherein said indefinite-shape particles are adhered with said binder.

5. The secondary battery in accordance with claim 1, wherein said porous electron-insulating layer has a porosity of 50% or more.

* * * * *